United States Patent [19]

Crean et al.

[11] Patent Number: 4,520,455
[45] Date of Patent: May 28, 1985

[54] PRINTING SYSTEM

[75] Inventors: Peter A. Crean, Penfield; Remo J. D'Ortenzio, Rochester; Carolyn P. Grow, Penfield, all of N.Y.

[73] Assignee: Xerox Corporation, Stamford, Conn.

[21] Appl. No.: 613,484

[22] Filed: May 24, 1984

Related U.S. Application Data

[62] Division of Ser. No. 376,884, May 10, 1982, Pat. No. 4,476,542.

[51] Int. Cl.³ .............................................. G06F 3/12
[52] U.S. Cl. .................................................... 364/900
[58] Field of Search ......................... 364/900 MS File

[56] References Cited

U.S. PATENT DOCUMENTS 4,153,940  5/1979  Grier et al. ..................... 364/900 X
4,231,096 10/1980  Hansen et al. .................. 364/900 X Primary Examiner—Raulfe B. Zache

[57] ABSTRACT

In a digital printer, method and apparatus for formatting printer control signals. According to the invention, characters to be printed are stored in ASCII format in the memory of a microprocessor system. Successive characters are formatted into an on/off bit mapping where a bit signal corresponds to a blank region and a bit signal corresponds to a darkened region. Eight bit slices of the characters are formatted until an entire print width is completed and stored in an 8 bit×N buffer where N varies with the desired printer resolution. In the preferred embodiment two buffers are used so that while the contents of one buffer are used to control the printer the second buffer can be bit formatted under microprocessor control.

5 Claims, 7 Drawing Figures

PRINTING SYSTEM

This is a division, of application Ser. No. 376,884, filed May 10, 1982 now U.S. Pat. No. 4,476,542 issued 10/9/84.

BACKGROUND OF THE INVENTION

1. Field of the Invention

The present invention relates to a printing system and more particularly relates to method and apparatus for formatting characters to be printed to control the actuation of an on/off print mechanism.

2. Prior Art

In the field of data communications various techniques are known for providing a hard copy record of information displayed on a CRT screen or the like or for printing the contents of a data processing memory unit. The most familiar yet perhaps not the most efficient hard copy printers are those using print elements configured in the shape of the characters to be printed. The traditional typewriter as well as higher speed electronic typewriters fall in this category of hard copy printers.

The speed with which data processing systems handle data has dictated that other type printers evolve which are capable of printing hard copy information at speeds not obtainable by the traditional typewriter and its electronically enhanced successors. To achieve greater printing speeds so called dot matrix printers are available which format characters from uniquely configured sequences of dots a line at a time. The increase in speed with which such printers can print is achieved at a cost of perceived degradation in print quality. The typical dot matrix printer is perceived as being useful for rough draft word processing but not of a good enough quality for most office environment printing.

In efforts to overcome the perceived difficulties with traditional typewriter and dot matrix printers, a group of non-impact yet high resolution character forming generators have evolved examples of which include a laser printer and an ink jet printer. The theory of operation for these two types of printers is similar. In the laser printer, for example, a charged photoconductive member is selectively discharged by a laser beam to encode the photoconductive member with information. Once the laser has selectively discharged a member, that member is developed and the developed image transferred to plain paper for subsequent fusing. In the ink jet printer, the development and fusing steps are obviated since the ink jet printer throws ink jet droplets towards a print medium to encode that medium with an information representation.

Some technique must be included in a print system utilizing either a laser printer or an ink jet printer to translate or convert digital data representing the characters to be printed into control signals for selectively activating either the laser in the laser printer or the ink jet generator in the ink jet printer. As it is known, one mechanism for representing characters in a digital format is the so called ASCII format of encoding information. The ASCII system involves the generation of a bit pattern of zeros and ones for each character in a particular language. This bit pattern in turn can be stored in a memory of a digital computer and used to generate control signals for the particular printer incorporated in the data communication's system. In the modern electronic typewriter, for example, the typewriter can interpret ASCII character codes directly to make a determination what character is to strike the print medium.

In the laser printer and/or the ink jet printer such a straight-forward interpretation technique is not possible since the laser and/or ink generator must be instructed to throw droplets to form an ink pattern rather than initialize the actuation of a particular character on a print head. In a laser printer, for example, the printer must be selectively turned on and off at controlled locations as the laser beam scans across the photoreceptor or photoconductor width so that only specified portions of the photoconductor member are discharged. The controlled activation is performed line by line as the laser beam sweeps across the photoconductor so that a series of on and off signals must be generated for each print pattern stored in the digital ASCII format. The resolution of a typical laser printer requires that only a small segment or swath of information is encoded onto the photoconductive member each time the laser beam sweeps across the member. It should be readily apparent, therefore, that the laser printer must include a mechanism typically incorporated into electronic circuitry for receiving an ASCII (or similar) bit representation designating a particular character to be printed and converting that ASCII representation into a series of on/off laser controls which will selectively discharge the charged photoconductive member at appropriate intervals as the laser beam sweeps that member.

U.S. Pat. No. 4,059,833 to Kitamura et al and U.S. Pat. No. 4,071,909 to Geller disclose prior art laser printing apparatus including circuitry for converting signals representing the characters to be printed into on/off control signals for selectively dissipating a charge on a charge photoconductive element. Each of the two printing systems disclosed in those patents includes apparatus for storing character representations in an ASCII format. As it is known, an 8 bit storage register is adequate for storing a given alphanumeric character in the ASCII representation system. Both systems utilize circuitry for converting ASCII representation stored in memory into control signals for selectively turning on and off the laser in the laser printing system.

The U.S. Pat. No. 4,059,833 discloses at column 30 a sequence of data transfer steps for parallel loading a bit pattern corresponding to a character in the ASCII system into a parallel to serial shift register and for clocking control signals from this shift register to the laser printer so that the ASCII characters can be encoded onto the photoreceptor. The method disclosed in this patent, however, requires that each character be loaded into the parallel to serial shift register a multiple number of times as that character is printed. Review of this patent would indicate that this technique for control signal generation is inefficient from a data manipulation standpoint.

The U.S. Pat. No. 4,071,909 also discloses a data manipulation technique for generating control signals. According to the technique disclosed in this patent a full page representation must be stored in memory prior to the generation of control signals. In particular, the control technique causes the laser to scan in a direction perpendicular to the normal left to right character appearance common in western cultures. Thus, before the printer can begin formating the data into bit patterns to control on/off laser operation, the entire page to be printed must be stored by the print system so that the characters can be formated.

Both systems disclosed in these patents involve fairly complex data manipulation techniques to perform the data conversion from ASCII coded characters to on/off type control signals to control a laser printer. It is believed that even if the systems embodied by these two patents were updated with present state-of-the-art microprocessor technology, the data manipulation techniques embodied by the hard wire circuitry disclosed in those patents would be inefficient.

SUMMARY OF THE INVENTION

The present invention comprises method and apparatus which simplify data manipulation techniques to perform the encoding function in a on/off laser type printing system. The formatting technique to be disclosed functions most efficiently in combination with a programmable microprocessor and direct memory access controller. This combination of hardware enables ASCII coded character elements to be efficiently formated, loaded into a parallel to serial shift register or buffer, and output to a laser print control for activating and thereby selectively dissipating the charge on a charged photoconductive element.

According to the invention, the printer has means for selectively encoding incremental areas across the width of a print medium such as a photoreceptor or the like. The apparatus further includes a memory for storing digital signals corresponding to characters to be printed on the print medium in a format representing the desired position of the characters on the print medium. Thus, in a laser print environment, the invention envisions the storage of ASCII coded signals in a format related to the relationship the characters have to each other on the printed page. A buffer memory is included for storing a binary signal mapping related to the appearance of a specific portion of the print medium. A first binary condition corresponds to a blank region on the print medium and a second binary condition corresponds to a printed area or region on the print medium. Essential to operation of the invention is a mechanism for formating the binary signals. Once a bit mapping for a given laser scan(s) is stored in the buffer memory area, an interface coupled to the printer transmits print signals corresponding to the binary signals stored in buffer memory causing the laser printer to selectively encode the charged photoconductive member.

It should be appreciated that although the preferred embodiment of the invention will be described in conjunction with the laser printer, the invention has utility for any on/off type print mechanism. Thus, the system could function equally well with an ink jet or thermal printer where the control signals are used to selectively encode incremental areas on the print medium.

A preferred embodiment of the invention envisions a digital storage buffer for storing the binary bit mapping according to N by M format where N is the total number of pixels across the print medium scanned by the laser printer and M is the width of the memory or buffer in which the bit mapping is stored. More specifically, an m=8 bit arrangement is envisioned such that data may be parallel loaded into the storage buffer in a sequence corresponding to the printed appearance of the character on the print medium.

The printing is done along the length of a line of words as those words appear on the printed page. Thus, the printer can begin formatting the binary signals before all characters for a given page are stored in the system memory. One representative configuration uses 40 laser scans per character height. If only 8 bits are stored in the buffer containing the bit mapping it is apparent that only one fifth of the line can be stored at a given time. To insure efficient data throughput the printing system includes two bit mapping buffers. While a first buffer is accessed to control laser printing, a second buffer is being loaded by the system controller with the next series of 8 bit bytes comprising the next print swath.

An ability to achieve proportional character spacing is one important feature of the invention. The number of 8 bit bytes of data needed to depict a given character varies with character width. The proportional spacing feature is implemented by varying inter-character spacing as the character is formatted.

From the above it should be appreciated that one object of the present invention is use of an efficient and straightforward control signal formatting technique for converting digital signals representing characters to be printed into on/off control signals to activate a printer. Other objects and features of the present invention will become clear when a detailed description of a preferred embodiment of the invention is considered in conjunction with the accompaning drawings.

DETAILED DESCRIPTION OF THE PREFERRED EMBODIMENT

Figure 1:
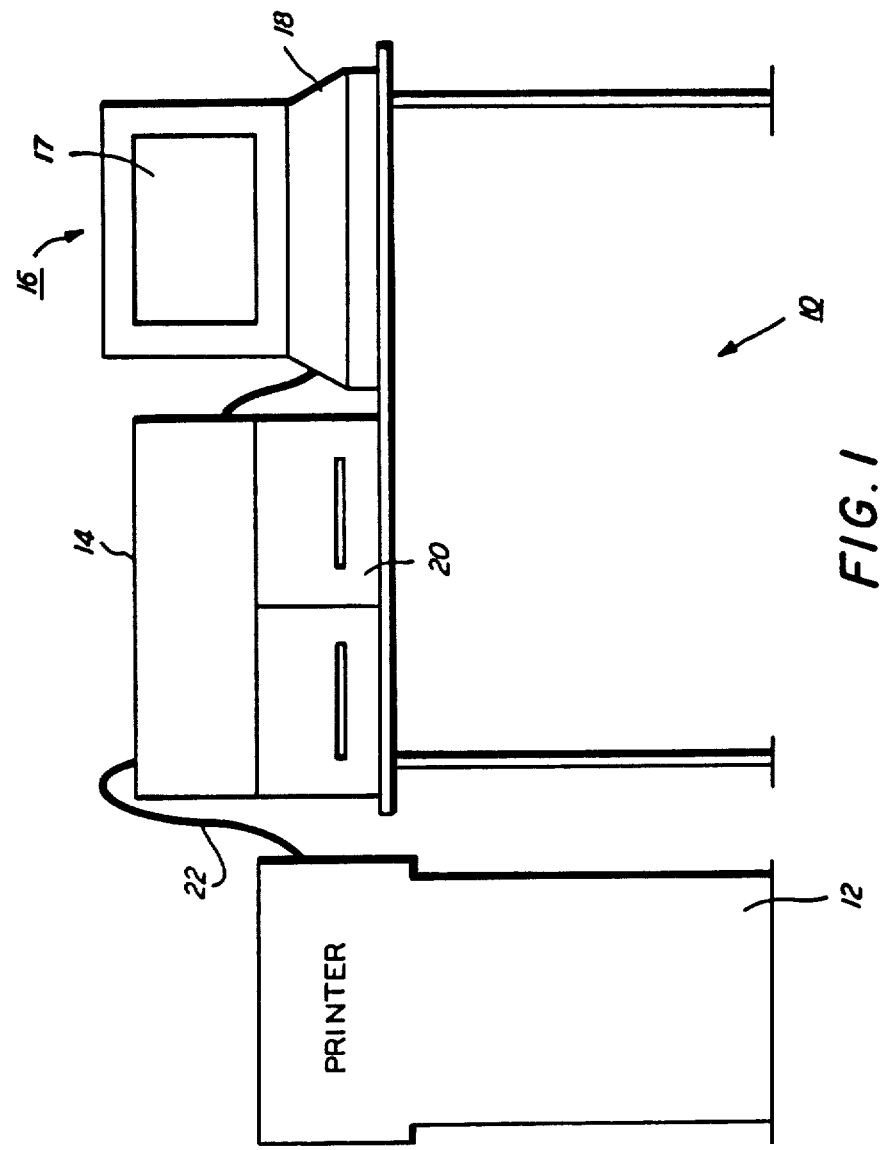
FIG. 1 is a schemaic of a printing system configured to utilize the present invention.

Turning now to the drawings and in particular FIG. 1 there is illustrated a micro computer based information processing system 10 comprising a printer 12 and a control module 14 which performs the task of formatting data and generating control signals for the printer 12 as well as providing data and information processing. One source of input data for the control module is generated on a video terminal 16 which includes a video monitor 17 and keyboard 18 which generates digital signals in response to the encoding of information by an operator through the terminal. As is typical with small computer system architectures known in the art, the system 10 further comprises a flopy disc drive system 20 for storing amounts of data greater than the one line storage capacity of the micro computer.

The printer 12 in a preferred embodiment comprises a laser printer wherein a conventional xerographic photoconductive member or photoreceptor is charged to a specific voltage and discharged under the action of a controllably energized laser beam which scans across the photoreceptor width. Those portions of the photoreceptor which are to remain charged are passed over and those which are to be discharged are energized by the laser beam. Once the photoreceptor has been encoded with information in this manner, a conventional xerograhic development system develops the charged image and this developed image is transferred to a member for fusing and storage in an output tray or the like. A commercial example of a laser printer is incorporated in the Xerox model 2700 (Registered Trademark) printer.

Figure 6:
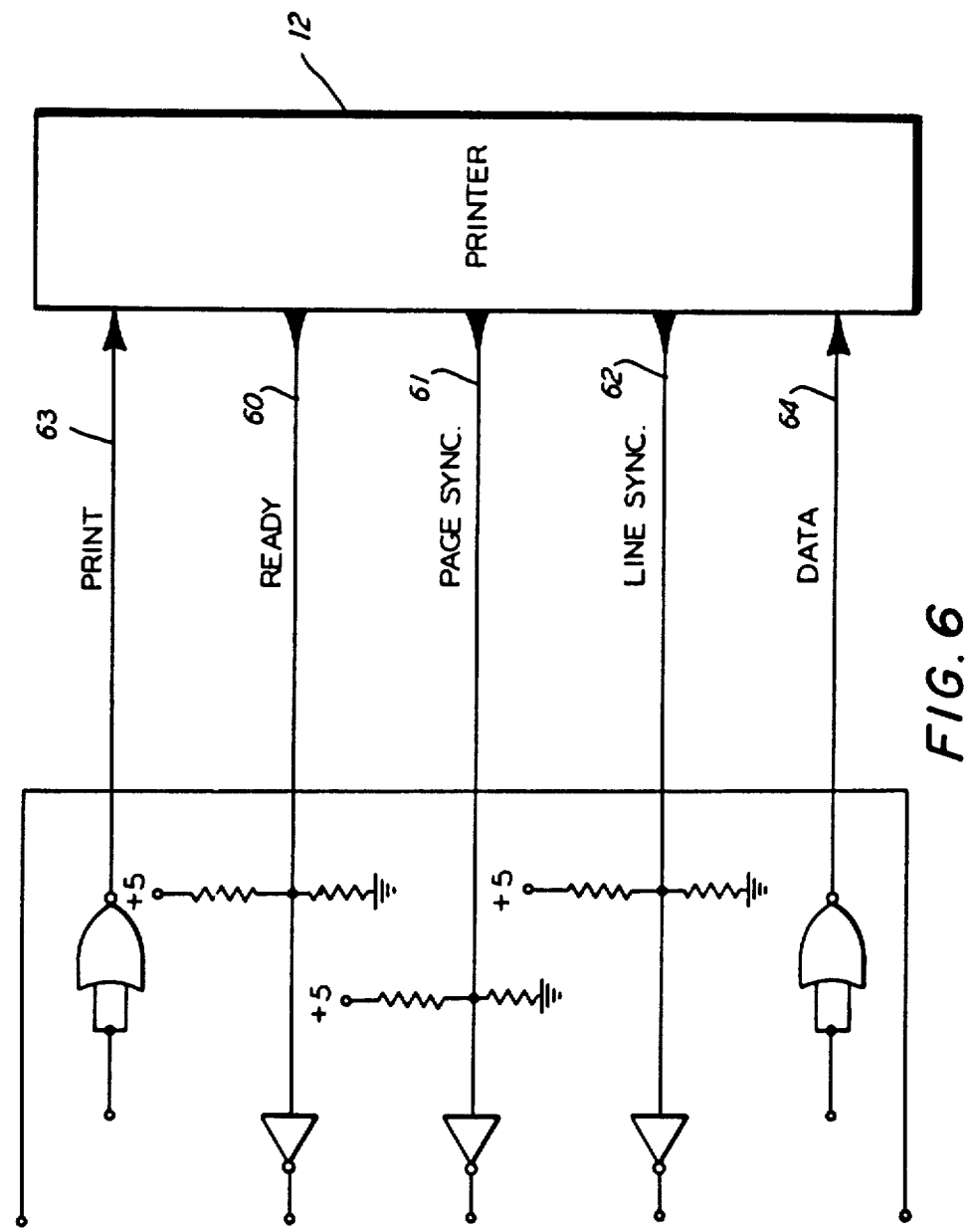
FIG. 6 is a schematic of the interface between a printer and the control circuitry.

As see in FIG. 1, the printer 12 interfaces with the control module 14 through a cable 22 (see also FIG. 6). The thrust of the present invention is the technique and apparatus for generating control signals to be transmitted along this cable 22 to control the on/off operation of the laser beam inside the printer 12. The interface electronics between the control module 14 and printer 12 will be described in further detail below. The signals transmitted between the video terminal 16 and the control module 14 comprise ASCII-type signals known in the art.

Figure 2:
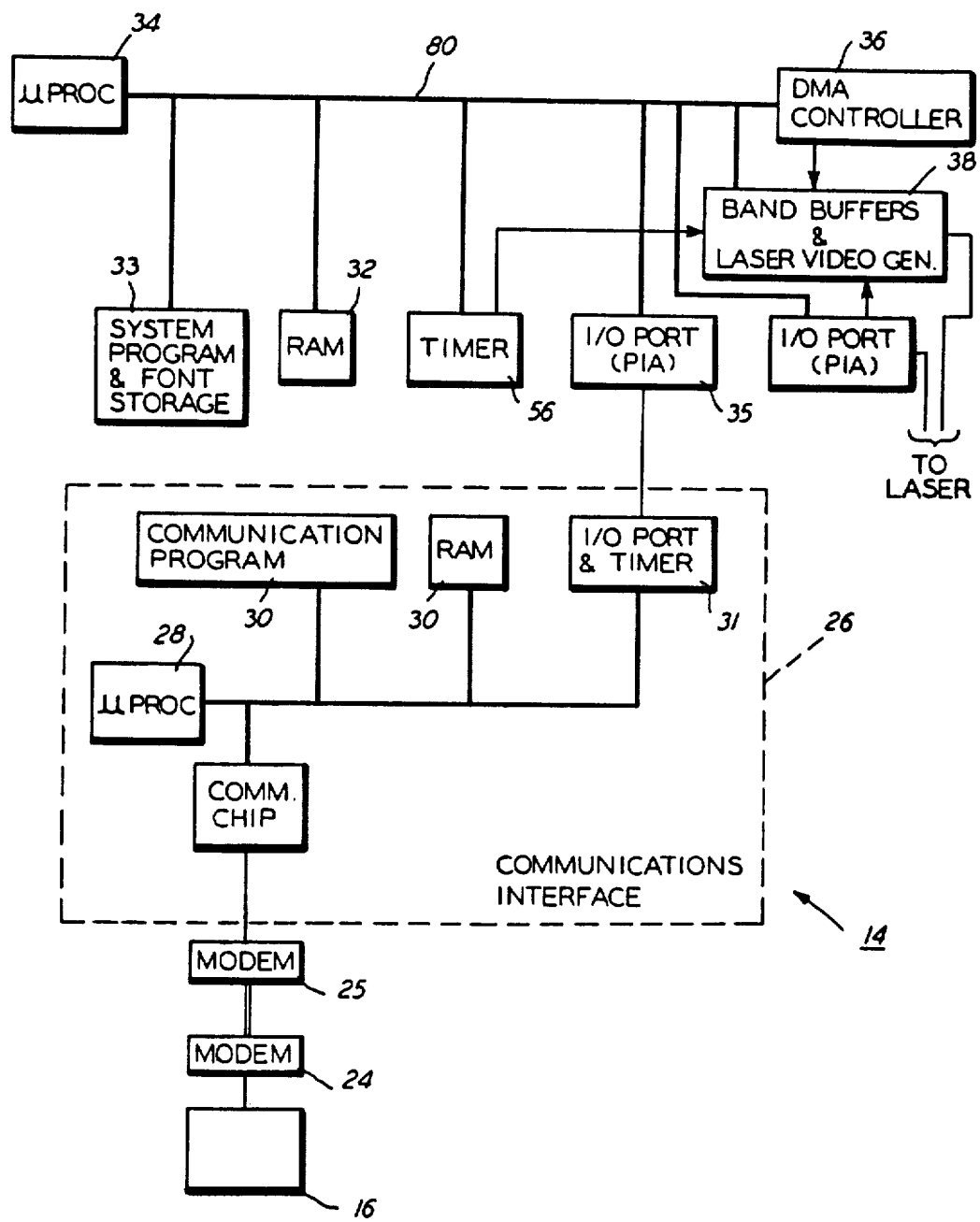
FIG. 2 is an electrical schematic for circuitry used in a preferred data formatting scheme embodying the invention.

A more detailed electrical schematic for the system 10 is illustrated in FIG. 2. In that system, the terminal 16 is shown communicating with the control module 14 (FIG. 1) through a communications interface module 26. If the terminal 16 is physically removed from the printer 12 and control module 14 the connection between interface module 26 and the terminal 16 comprises a pair of communications modems 24,25. The communications interface module 26 comprises a communications interface chip 27, its own microprocessor unit 28 and memory units 30 and an input/output port and timer 31 for communicating with the rest of the control module 14. The function of the communications interface module 26 is to format the data received from the video terminal 16 so that it can be stored in the control module memory 32.

One task the present system can perform is to print the information from a data source such as a Xerox 860 (Registered Trademark) information processor or the like. To do so it is necessary that the control module 14 format the data received from the information processor. The microprocessor 28 in combination with the microprocessor communications program stored in a memory unit 30 causes the data transmitted through the modems 24, 25 to be stored in RAM 30.

The control module 14 also comprises a second microprocessor 34 and memory 32 comprising a read and write memory unit for storing the data input from the terminal 16. The two microprocessors 28,34 shake hands and direct the transmittal of data through their respective input/output ports 31,35 to RAM unit 32 in format corresponding to the appearance of the page to be printed by the printer 12. This second microprocessor 34 executes its operating system from instructions stored in non-volatile memory 33.

The technique for formatting the ASCII configured digital data signals corresponding to the characters to be printed into on/off bit patterns used for controlling the laser printer portion of the system comprises the essence of the present invention. The description of the preferred embodiment will be discussed in conjunction with a specific example wherein a portion of the data to be printed will be examined in detail as that portion is formatted into its on/off bit mapping inside the control module. In this regard, reference is made to FIG. 3 wherein the word "FILE" is displayed as that word would appear on the video monitor 17 of the terminal 16 and also as the word should appear on the output from the laser printer 12. It is assumed that the interface electronics 26 can transmit all four letters comprising the word "FILE" to microprocessor RAM memory unit 32 such that each letter has a unique memory location wherein is stored the ASCII bit pattern for the particular letter to be printed. Thus, the ASCII notation for the letter "F" is stored in its own unique memory location 32 corresponding to the location of the letter "F" on the page to be printed by the printer 12.

Figure 4:
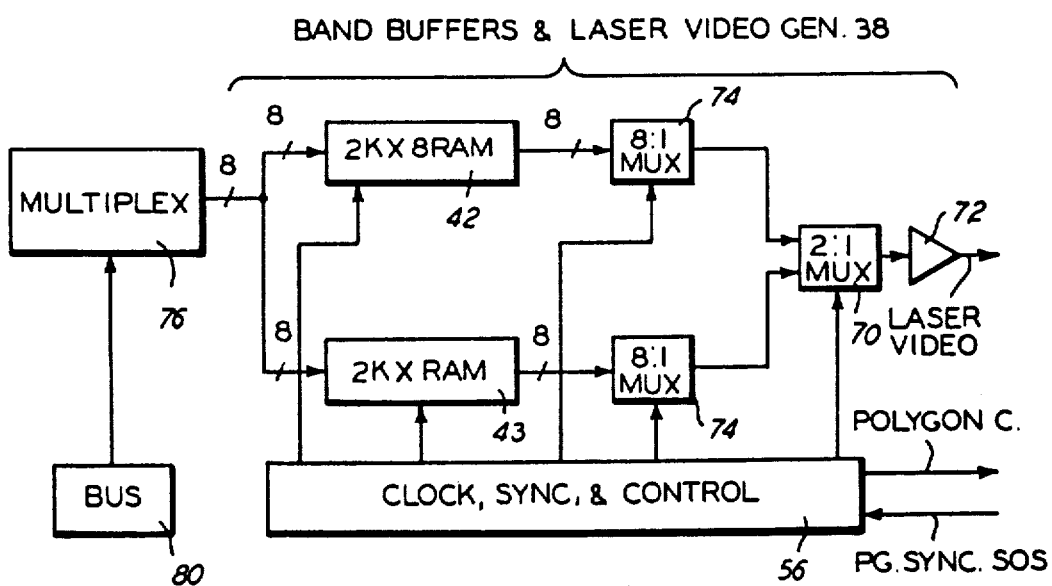
FIG. 4 is a schematic of circuitry for storing the on/off bit mapping of FIG. 3.

It is the task of the microprocessor 34 in combination with a DMA controller 36 and a buffer unit 38 to store the reformatted bit pattern so that the interface driver 40 (FIG. 4) can turn the laser beam on and off and correctly encode the photoreceptor with the letters FILE. The buffer unit comprises two 2k×8 RAM storage units 42, 43 which store the bit patterns to drive the laser printer 12. Two memory buffer units are used so that as the bit mapping for a first unit is driving the laser printer, a second of the two units 43 is being loaded with on/off control signals by the microprocessor 34 with the help of the DMA controller 36.

Figure 3:
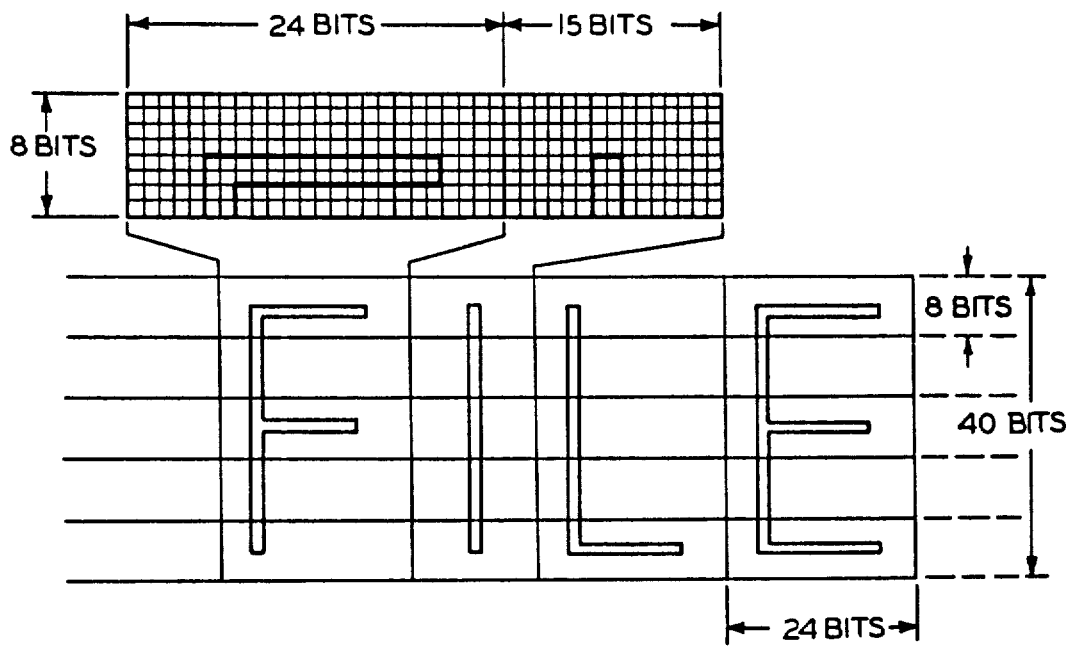
FIG. 3 illustrates a portion of a sequence of characters to be printed with an enlarged representation showing an on/off bit mapping for that portion.

Referring again to FIG. 3, each of the letters has been segmented into five parts from top to bottom. An enlarged view of the topmost portion of the letter "F" is shown in FIG. 3 indicating a bit mapping for that portion of the "F" as that bit mapping is stored in one of the buffer memory units 42, 43. In operation, the microprocessor unit 34 accesses the RAM memory unit 32 to obtain the information that the letter "F" is to be printed at a particular location on the RAM formatted page. The bit format for the letter is then generated and loaded into buffer memory unit 42 in parallel fashion 8 bits at a time.

Figure 5:
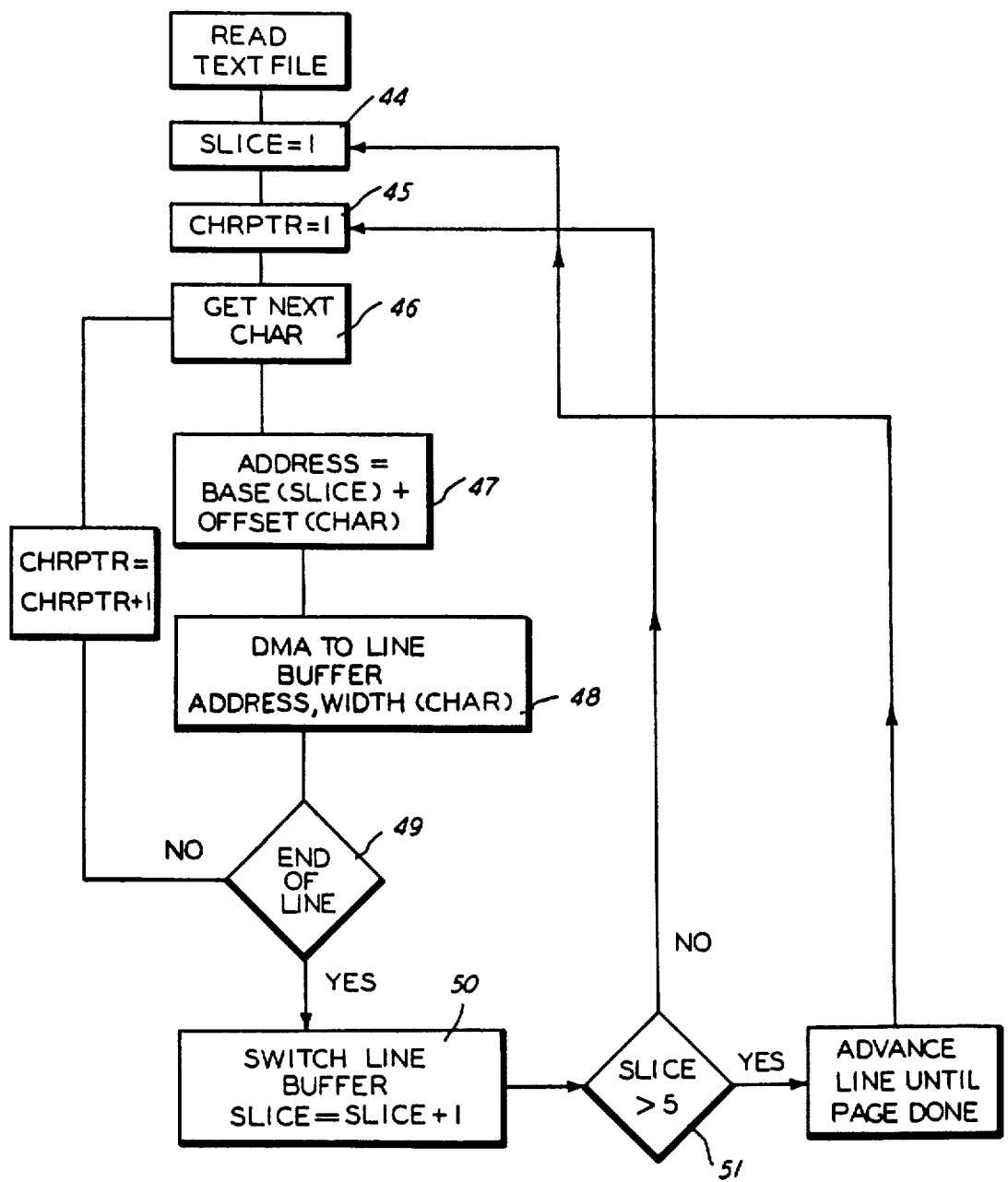
FIG. 5 is an algorithm for generating the on/off print signals by a system microprocessor.

The algorithm for formatting this bit pattern is illustrated in flow chart form in FIG. 5. After the microprocessor 34 conducts some bookkeeping steps 44, 45 to keep track of where it is in the formatting procedure, a first character is accessed 46 from microprocessor memory (in this example the letter "F") and the bit format for that character is determined 47 from a table look-up in microprocessor memory 33. The particular look-up table address depends upon the portion of the letter to be formatted (in this terminology used in the flow chart it depends on which slice of the letter is to be printed) and, of course, the particular character to be printed. The look-up table format starts sequentially with the first character stored in memory and runs through all characters. In this regard, it should be appreciated that different look-up tables could be used for different printing fonts. Each of these fonts are stored in memory 33 and will, of course, have different bit mappings.

Knowledge regarding the character and character slice allows the microprocessor 34 to determine at step 47 the beginning address in memory for the bit pattern corresponding to the first slice of the letter "F" illustrated in FIG. 3. The microprocessor 34 transmits this address information to the DMA controller 36 telling it (step 48) to begin at this address and load the first buffer memory unit 42 with the contents of this and the next twenty-three subsequent address locations so that the first slice of the letter "F" in bit format configuration is transmitted from microprocessor memory to the buffer memory unit 42.

The preferred embodiment of the invention uses a convention wherein a zero (low) bit status on a data interface line (FIG. 7) is an indication that the printer is to leave charged a particular photoreceptor area or pixel and a one (high) bit means the laser is to discharge a particular region. In the example illustrated above, the first five bytes transmitted from the microprocessor memory location to the buffer memory unit will contain all ones which will be loaded in parallel fashion in the memory unit 42. A 6th byte as seen in FIG. 3 will be half zeros and half ones to indicate that the bottom half of the byte corresponds to locations on the charge photoconductive member to be left uncharged by the laser beam. This results in those portions of the member remaining charged and therefore developed during a developing step in printer operation. The microprocessor resumes control of the formatting operation after the DMA controller 36 has performed the data transfer for the first slice (24×8 bit mapping) of the letter "F".

As seen in the flow chart (FIG. 5) the next step 49 in the process is to determine whether an end of line has been reached. Typically, this will not be the case so that the microprocessor returns to get a next character (in the example illustrated the next character is the letter "I") and formats the first slice of that character. It should be appreciated by reference to the FIG. 5 flow chart that the slice designation at this stage has not been altered so that the microprocessor knows to get the first slice from the letter "I" rather than any one of the other four slices which the letter has been divided into. Once the correct look-up table address for the first slice of the letter "I" is known, the microprocessor transfers control of the storage function back to the DMA controller 36 so that the 8 by 15 bit mapping for the first slice of the letter "I" can be stored in buffer memory. This process continues across the complete scan width for the laser printer one character at a time. It should be appreciated to those skilled in the art that the exact number of characters comprising one scan line varies for a particular font that is being utilized as well as the character content of that line. The number of pixels across each character varies with the character and also varies to provide a proportional spacing capability. Thus, while in the example the letter "F" takes 24 eight bit bytes in the first (and succeeding) swath the narrower letter "I" only requires 15 eight bit bytes.

It should be recalled from above that the preferred circuitry comprises two buffer memories 42, 43. Once a particular slice has been loaded into a first of two buffers 42, the microprocessor 34 causes the sequence of 8 bit bytes in the next slice to be stored in the second buffer 43. The process of switching buffers and incrementing the character slice is accomplished at step 50 of the flow chart (FIG. 5) The characters are again stored one at a time as in the illustration discussed previously until the second buffer has been filled with character bit mappings. The particular format chosen for the preferred embodiment of the invention comprises 5 character slices per line of character illustration. Stated another way, it requires 40 complete scans to generate each of the character lines. When the slice designation is incremented at step 50 a test 51 is conducted to see if the slice designation is greater than 5. If the slice is greater than 5 a line of characters has been formatted and the formatting of the next line begins again at step 44.

Figure 7:
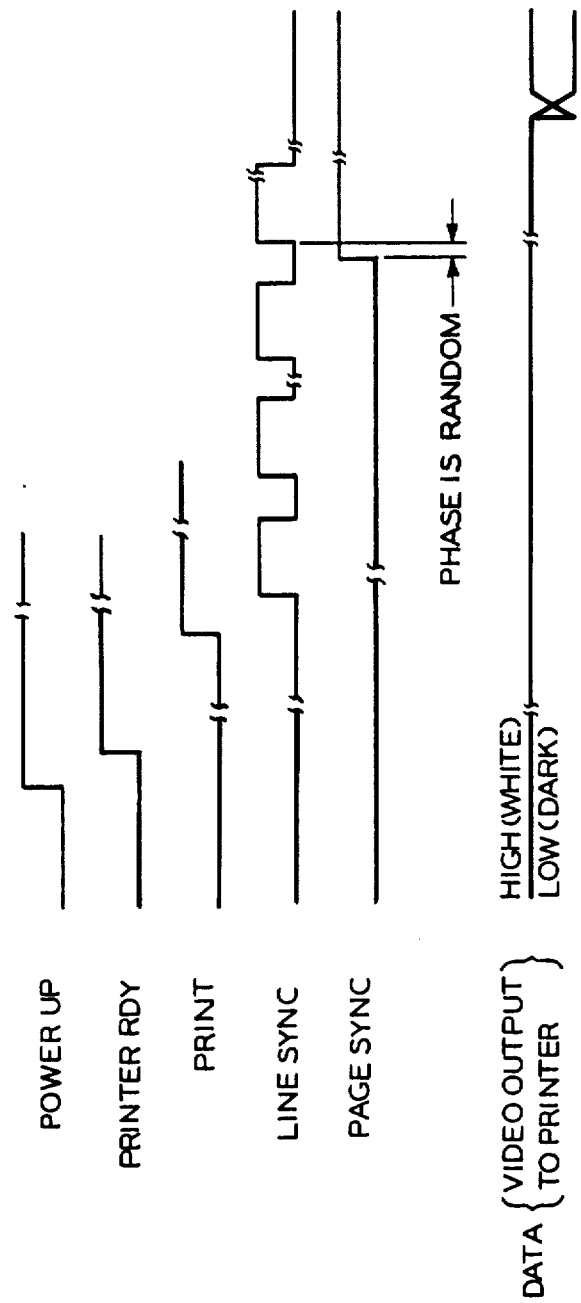
FIG. 7 shows a timing diagram for the printer control signals.

The interface between the printer 12 and the control unit 14 is shown in FIG. 6. It is appreciated to those skilled in the art that the timing of the signals generated for controlling the printer 12 occur at intervals as dictated by a system clock 56. The interface between printer and control module 14 includes five communications lines, 60-64, two of which (63,64) direct signals from the control module to the printer and three of which (60,61,62) are status outputs from the printer back to the control module. Initially, a ready signal on line 60 from the printer to the control module indicates the printer is ready to receive print data from the module according to the bit mapping stored in the buffer memories 42, 43. The page sync 61 and line sync 62 signals from the printer are timing signals indicating the transition between pages and lines as the printer operates. Once a ready signal 60 has been received from the printer 12, a start print signal from the control module 14 to the printer is generated along print line 63. Subsequent to the receipt of this print signal, print data in the form of on/off signals corresponding to whether the laser is to be activated or to pass over a portion of the charged photoconductor are transmitted along data line 64. A timing diagram for these five signals is shown in FIG. 7.

The input to the data line 64 comprises a 2:1 multiplexed latch 70 and driver 72 (FIG. 4) which receive input data from one of two multiplex units 74. The multiplex unit 70 receives the contents of the two buffer memories 42, 43 such that while one of these two units 42, 43 is accessed to control print operations a second memory unit is being filled under control of the microprocessor 34 in combination with the DMA controller 36. Data is clocked from the buffer memories 42, 43 to the multiplexer 70 and driver 72 in serial bit fashion across a complete scan width. Since a particular memory unit 42, 43 contains a bit mapping 8 bits wide data from the buffer units is multiplexed by one of the 8:1 multiplex units to insure the contents of the correct scan line control printing. As operation continues, first one and then the other of the buffer memory units 42, 43 is loaded and then used to control the laser printing of the printer 12. An additional multiplex unit 76 controls data transfer from a system bus 80 to the two buffers 42, 43. This data manipulation and transmission utilizing a moderate speed buffer allows a relatively low speed microprocessor to control a relatively high speed printing operation.

The disclosed preferred embodiment of the invention includes a number of features which should be emphasized. The particular fonts or character appearance can be stored in non-volatile memory which can be changed depending upon user applications. Proportional or variable character spacing is a feature readily performed by the present format scheme. The data is stored in page format and printed in a horizontal manner so that a complete page need not be generated by the user before the laser printer is instructed to begin printing the first portion of a particular page. A extremely efficient memory scheme for the control module 14 is utilized in this print scheme. The requisite amount of memory is dependent upon the resolution with which the printer is operating. If, for example, a 240 pixel per inch character resolution is required, only 2k×8 RAM buffers 42, 43 are required to completely store the bit mapping for a particular scan width. Naturally, as the resolution of the printer is increased to higher pixel per inch resolutions, additional memory may be required. It should be noted, however, that for a preferred embodiment of the invention a 480 pixel per inch resolution is achievable with only a 4k×8 memory buffer.

The disclosed embodiment of the invention has been described with particularly but is should be appreciated that the use of the invention can vary depending upon the user requirements. Thus, although a laser printer has been utilized to describe the printing operation, it should be appreciated that any on/off type printing scheme such as an ink jet printer would work equally well with the disclosed system. For this reason it is the intent that all modifications and/or design changes falling within the spirit or scope of the appended claims be covered by the present invention.

We claim:

1. In character printing a method of formatting the characters to be printed into binary signals to act as control signals for an on/off print mechanism comprising the steps of storing signals representing the characters to be printed in a signal storage member according to a scheme related to the desired appearance of those characters on a print media;

formatting and storing binary signals to control the printing of a portion of each character across a print width until the binary signals for an entire print width are stored, and directing the on/off printing operation of a print medium's print width by serially accessing the stored binary signals for that print width and using those signals to control the on/off mechanism; and repeating said steps of formatting, storing, and directing until all characters have been printed.

2. The method of claim 1 wherein said formatting step comprises the generation of binary signals for a slice of each character, one character at a time and wherein the storing of each character slice is performed prior to the formatting of the next character.

3. The method of claim 2 wherein each slice comprises an 8 bit wide mapping of on/off print control signals.

4. The method of claim 3 wherein the binary signals are stored in 8 bit wide storage buffer in parallel byte fashion and wherein these binary signals are serially accessed to control said printing operation across a printing scan width one bit at a time until an entire scan width is printed so that the 8 bit wide binary signals control 8 printing scans across said media.

5. The method of claim 4 wherein the storing step is accomplished using two 8 bit wide storage buffers so that while one buffer is sending control signals to control the print operations a second buffer is loaded with formatted signals for the next eight scan widths.

* * * * *